Patented June 9, 1953

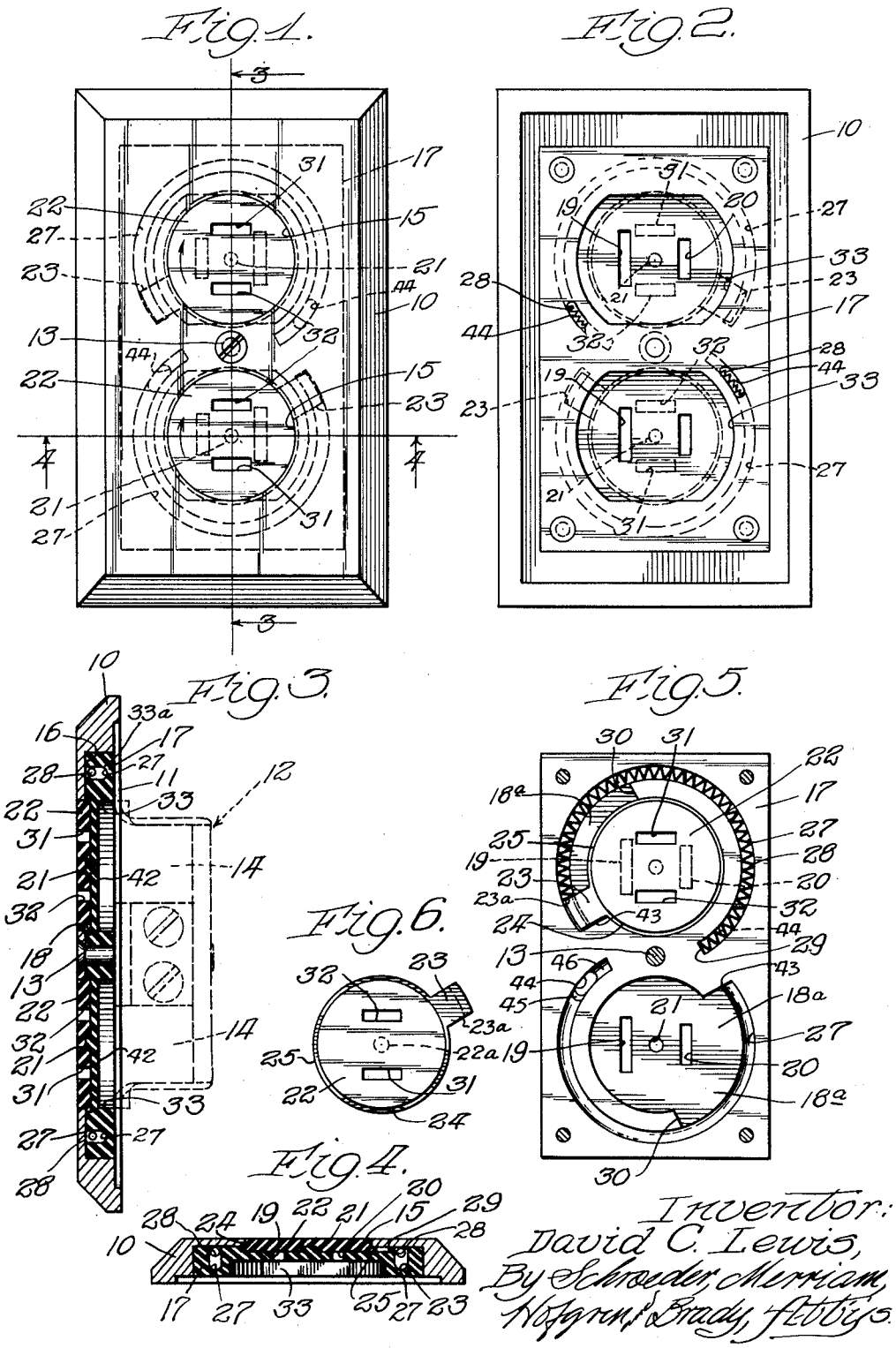

2,641,627

UNITED STATES PATENT OFFICE 2,641,627

SAFETY COVER PLATE FOR FLUSH TYPE ELECTRIC WALL RECEPTACLES

David C. Lewis, Chicago, Ill.

Application June 13, 1952, Serial No. 293,233

7 Claims. (Cl. 174—67)

This invention relates to an electrical safety device, and more particularly to a safety cover plate for attachment to a flush type electric wall receptacle which is mounted in a box in the wall.

A number of accidents, particularly involving children, have occurred from electrical shocks received from the conventional type of wall receptacle, which has slots adapted to receive the blades of an appliance plug cap for establishing a current through the cap. Instances have occurred where children have inserted bits of metal or wire such as hair pins or the blades of a scissors into the slots of the receptacle and thereupon received a severe and injurious shock.

Wall receptacles containing a safety device have been developed to prevent such accidents, but any such unit to the best of my knowledge requires that the entire receptacle be removed and replaced with one embodying a safety device. This is an expensive and sometimes difficult process.

I have invented and am herein disclosing and claiming a safety type cover for a wall receptacle which may be attached to the receptacle by merely removing the screw which holds the conventional type cover plate in position, removing the cover plate and replacing it with the cover plate of this invention which may then be secured to the receptacle by the same screw used to secure the previous cover or, if necessary, by a slightly longer screw. With the cover plate of this invention in place over a wall receptacle it is impossible accidentally to insert wire or other metal into the slots of the socket. Nevertheless, the blades of a plug cap may be inserted into the socket by a simple operation.

The invention will be described in conjunction with the accompanying drawings in which:

Fig. 1 is a plan view of the cover plate of this invention indicating the various parts beneath the plate by dotted lines;

Fig. 2 is a view taken of the underside of the device shown in Fig. 1;

Figs. 3 and 4 are sections along lines 3—3 and 4—4, respectively, of Fig. 1;

Fig. 5 is a view of the base plate separated from the cover plate and shown with and without the rotatable disc secured thereon, and Fig. 6 is a plan view of a rotatable disc member constituting a part of the cover plate apparatus.

Referring now to the drawings, I show a face plate 10 adapted to be secured to the mounting strap 11 of a conventional flush type duplex wall receptacle 12 by means of a screw 13 extending through a hole in the face plate and threaded into the strap 11. The receptacle is mounted in an outlet box (not shown) in the usual manner, and has two socket members 14. The face plate 10 has a safety device for each of the sockets 14, and inasmuch as the parts of each device are substantially identical, similar parts will be given similar reference numerals.

The face plate 10 is provided with a circular opening 15 therein adapted to be located over a socket 14. The underside of the cover plate is provided with a hollowed out portion 16 in which a base member 17 is secured by means of the rivets shown, or otherwise as desired. For example, if the device is made of thermo-plastic material the face plate 10 may be provided with a plurality of small integral tits which extend into apertures in the base member 17 and are fused therein.

The base member is constructed of a dielectric material and is provided with recesses 18 and 33 which are in register with each other in opposite faces of the base member to leave only a thin central plate 42 overlying the end of the socket 14 which projects into said recess 33, the outer portion of the base member affording a thickened, or offset portion 33a which forms the margin of the recess 33. The margin of the recess 18 is circular except over about 100° of its circumference, where a lateral extension 18a of said recess extends to the margin of an arcuate groove 27 which is formed in the thickened portion 33a in the same face of the base member 17 as the recess 18 and which partially encircles the thin plate 42. The groove is deep enough that its bottom is opposite the recess 33; and it is spaced from the margin of the recess 18 except over the span of the extension 18a. The margins of the extension 18a form a first abutment 30 adjacent the groove 27 and a second abutment 43 at an end of the groove.

Formed in the thin plate 42 are two slots 19 and 20 so located as to be positioned directly over the slots existing in the socket 14. An upstanding boss 21 is formed on the plate 42 at the center of the recess 18 and the center of the opening 15 to serve as a center pivot for a rotatable circular disc 22 which fills the recess 18 and has a center recess 22a to receive the boss 21. A finger portion 23 on the disc 22 projects across the extension 18a and has a flange 23a at its end which lies in the groove 27. The edge of the disc is stepped as shown to provide a riser portion 24, the height of which is not greater than the thickness of the face plate 10 adjacent the edge of the opening 15 so that the outer surface of the disc is flush with or below the outer surface of the face plate. The tread portion 25 of the disc projects beneath the margin of the opening 15 and rides on the undersurface of the face plate 10 as shown to retain the disc on its pivot.

Located in the arcuate groove 27 in the base member is a compression spring 28 having one end bearing against the end 29 of the groove opposite the abutment 43 and having its other end bearing against the flange 23a on the finger portion 23 of the disc 22 so as to urge said finger portion against the abutment 43, in which position a pair of slots 31 and 32 in the disc are 90° out of alignment with the slots 19 and 20 in the thin plate 42. The slots 31 and 32 may be aligned with the slots 19 and 20 only by inserting the blades of an appliance plug cap into the slots 31 and 32 and rotating the disc 22 against the spring pressure until the finger member 23 strikes the stop 30. At that time all slots will be aligned, and the blades may be pushed into the slots in the socket 14. When the plug cap is removed from the socket, the spring 28 bearing against the flange on the finger 23 returns the disc 22 to its original position with the slots in the disc 22 and the slots in the socket 14 disaligned so that it is impossible to insert an object through the slots in the disc and into the slots in the socket 14.

It will be noted from the foregoing that the cover plate of this invention may be secured to the ordinary flush type wall receptacle by merely removing the screw 13, replacing the old cover plate with the cover plate of this invention and then replacing the screw. Furthermore, the combined thickness of the thin plate 42 and the disc 22 is no more than ⅛ inch, which permits the blades of an American Standard attachment plug cap to project through the aligned slots in the device and be firmly gripped in the slots of the socket 14. Standard wall receptacles have spring clips in the slots to receive and grip the blades of an attachment plug cap, so that the cap blades will be firmly retained in the receptacle slots. The National Electrical Manufacturers Association has established standard dimensions for attachment plug caps and wall receptacles, and these standards have been published by the American Standards Association in order to permit complete interchangeability of attachment plugs and receptacles produced by different manufacturers. If a safety cover plate is to be usable with American Standard plug caps and receptacles the combined thickness of the plate and the disc covering the face of the receptacle cannot exceed about ⅛ inch. If the thickness of material over the receptacle exceeds about ⅛ inch, the blades of the plug cap cannot extend into the spring clips of the receptacle far enough to be gripped by such clips so as to retain the plug cap in the socket.

The device is assembled by first seating the discs 22 on the pivot bosses 21 of the thin plate portions 42. The face plate 10 and the base member 17 are then secured together in any convenient manner as by riveting or in the case of thermoplastic materials by fusing them together with pegs in the cover plate in one member which extend through apertures in the base member. Adjacent the ends of the spring grooves 27 which are opposite the abutments 43 are spring inserting apertures 44 each of which, as seen in Fig. 5, has an edge 45 which is beveled away from the adjacent end of the groove 27. The compression springs 28 may be inserted into the arcuate spring grooves 27 through the spring inserting apertures 44 after the assembly of the cover plate 10 and base member 17, and the beveled edges 45 facilitate passage of the springs into the channels 27. As is apparent from Figs. 2 and 5, the spring inserting apertures 44 are spaced a short distance from the adjacent ends of the grooves 27, leaving end portions 46 in the grooves, so that when the rear ends of the springs have entered the grooves the slight compression on the springs causes them to elongate to fill the entire grooves so that four or five coils of the springs are positioned in said end portions 46 of the grooves 27 so that the springs are retained in place in the grooves.

While I have shown and described certain embodiments of my invention, it is to be understood that it is capable of many modifications. Changes, therefore, in the construction and arrangement may be made without departing from the spirit and scope of the invention as disclosed in the appended claims.

This application is a continuation-in-part of my copending application Serial No. 98,086, filed June 9, 1949, now abandoned.

I claim:

1. A safety cover plate for attachment to a flush type electric wall receptacle having a socket with spaced slots, comprising: a face plate; a thin base plate of dielectric material secured to the face plate, said base plate having a relatively thick portion which has an arcuate edge defining a socket-receiving recess to receive the end of a socket in said receptacle, said base plate having spaced slots therein to be registered with the slots in the socket; an arcuate spring-receiving channel in the other side of the base plate and formed in said thick portion; a disc-receiving recess formed in said other side of the base plate and surrounded by the channel, said disc-receiving recess being in register with the socket-receiving recess, whereby only a very thin plate portion overlies the socket; an integral boss formed at the center of said disc-receiving recess; a thin disc of dielectric material having a center recess by which it is rotatably positioned on said boss in said disc-receiving recess, said disc having spaced slots therein adapted to be aligned with the slots in the base plate; and a spring in the channel bearing upon the disc to urge said disc to rotate toward a position disaligning said slots.

2. A safety cover plate for attachment to a flush type electric wall receptacle, comprising: a face plate; a thin base plate secured to the face plate, said base plate being of dielectric material and having a relatively thick marginal portion which has an arcuate edge defining a socket-receiving recess to receive the end of a socket in said receptacle, said base plate having spaced slots therein to be registered with the slots in the socket; an arcuate spring-receiving channel in the other side of the base plate and formed in said thick portion; a disc-receiving recess formed in said other side of the base plate and surrounded by the channel, said disc-receiving recess being in register with the socket-receiving recess, whereby only a very thin plate portion overlies the socket; a thin disc of dielectric material in said disc-receiving recess, said disc having spaced slots therein adapted to be aligned with the slots in said base plate, integral means on said disc-receiving recess engaging integral means on the disc to rotatably position said disc in said disc-receiving recess; and a spring in the channel and bearing upon the disc to urge said disc to rotate toward a position disaligning said slots.

3. A safety cover plate for attachment to a flush type electric wall receptacle, comprising: a thin base plate of dielectric material which has a relatively thick portion having an arcuate edge defining a socket-receiving recess to receive the end of a socket in said receptacle, said base plate having spaced slots therein to be registered with the slots in the socket; an arcuate spring-receiving channel in the other side of the base plate and formed in said thick portion; a circular disc-receiving recess formed in said other side of the base plate and surrounded by the channel, said disc-receiving recess being in register with the socket-receiving recess, whereby only a very thin plate portion overlies the socket; a thin flat circular disc of dielectric material rotatably positioned in said disc-receiving recess, said disc having a stepped edge and having spaced slots adapted to be aligned with those in the base plate; a face plate secured to the base plate and having a circular opening therein the margin of which overlies said stepped edge, the surfaces of said face plate and said disc being substantially coplanar; and a spring in the channel bearing upon the disc to urge said disc to rotate toward a position disaligning said slots.

4. A safety cover plate for attachment to a flush type electric wall receptacle, comprising: a face plate; a thin base plate of dielectric material secured to the face plate, said base plate having a relatively thick portion which has an arcuate edge defining a socket-receiving recess to receive the end of a socket in the wall receptacle, and having spaced slots therein to be registered with the slots in the socket; an arcuate spring-receiving channel in the other side of the base plate and formed in said thick portion; a disc-receiving recess formed in said other side of the base plate and surrounded by the channel, said disc-receiving recess being in register with the socket-receiving recess whereby only a very thin plate portion overlies the socket; a thin disc of dielectric material, said disc having spaced slots adapted to be aligned with the slots in said base plate; means for rotatably supporting said disc in said disc-receiving recess; a spring in the channel bearing on the disc to urge said disc to rotate toward a position disaligning said slots; and stop means for stopping rotation of the disc when the slots therein are aligned with the slots in the base plate to permit the blades of an appliance plug cap to be inserted through said slots into the slots in the socket.

5. A safety cover plate for attachment to an electric wall receptacle contained in a wall box, which receptacle has a socket provided with spaced slots containing clips to receive and grip the blades of an electric appliance plug cap, comprising: a rectangular face plate of a size sufficient to cover the entire opening in the wall box; a base plate secured to the rear of said face plate, said base plate having a recessed portion which affords an integral thin flat plate to overlie the entire end of the socket in said receptacle, said thin plate having a smooth outer surface upon which the ends of the blades of a plug cap may slide freely and having slots in register with those in the socket; an integral boss at the center of the plate; a thin flat circular disc of dielectric material conforming substantially to the size of the end of the socket and having a central recess by which it is positioned on said boss in surface abutting relationship to the outer surface of the thin plate and having spaced slots adapted to be aligned with the slots in the thin plate upon rotation of the disc, the total thickness of said thin plate and said disc being small enough that the blades of an attachment plug cap may extend through the apertures in the disc and the thin plate to be gripped by the clips in the socket; and resilient means spaced laterally from the disc urging it to rotate to a position disaligning said apertures.

6. A safety cover plate for attachment to a flush type electric wall receptacle having a socket with spaced slots, comprising: a face plate having an opening; a thin base plate of dielectric material secured to the rear of the face plate, said base plate having registering recesses in its two faces beneath the opening in the face plate and a pair of slots in the recesses adapted to register with the slots in the socket, and having a relatively thick portion surrounding said two recesses with a spring channel in said thick portion which has its open side toward the face plate, there being a spring-inserting aperture in the bottom of said spring channel adjacent one end thereof; a thin disc rotatably mounted in the recess adjacent the face plate, said disc having a pair of slots which may be aligned with the slots in the base plate and having a portion projecting into said channel at the end opposite the spring-inserting aperture; and a compression spring in said spring channel with one end abutting against said portion of said disc and the other end abutting against the end of the channel adjacent said spring-inserting aperture.

7. A safety cover plate for attachment to a flush type electric wall receptacle having a socket with spaced slots, comprising: a face plate having an aperture; a thin base plate of dielectric material secured to the under side of the face plate, said base plate having a relatively thick portion which has an arcuate edge defining a socket-receiving recess to receive the end of a socket in the wall receptacle, and having slots therein to be registered with the spaced slots in the socket; an arcuate spring-receiving channel in the other side of the base plate and formed in said thick portion; a circular disc-receiving recess formed in said other side of the base plate with its outer margin wholly within and spaced from the spring-receiving channel, said disc-receiving recess being in register with the socket-receiving recess whereby only a very thin plate portion overlies the socket, and there being an extension of said recess which extends to the spring-receiving channel and occupies slightly more than one-fourth of the circumference of the recess; a thin circular disc of dielectric material rotatably supported in said disc-receiving recess, said disc having spaced slots adapted to be aligned with the slots in said base plate and having an arm extending across said extension of said recess with a flange in said spring-receiving channel; and a spring in the channel bearing on said flange to urge the disc to rotate toward a position disaligning said slots.

DAVID C. LEWIS.

References Cited in the file of this patent

UNITED STATES PATENTS

| Number | Name | Date |
| --- | --- | --- |
| 866,105 | Whittlesey | Sept. 17, 1907 |
| 1,825,638 | Schutt | Sept. 29, 1931 |
| 2,119,428 | Englar | May 31, 1938 |
| 2,154,159 | Hamilton | Apr. 11, 1939 |
| 2,455,582 | Hoessel | Dec. 7, 1948 |
| 2,515,870 | Hamilton | July 18, 1950 |

FOREIGN PATENTS

| Number | Country | Date |
| --- | --- | --- |
| 396,520 | Great Britain | Aug. 10, 1933 |
| 500,653 | Great Britain | Feb. 14, 1939 |